(12) United States Patent
Hsueh et al.

(10) Patent No.: US 7,652,719 B2
(45) Date of Patent: Jan. 26, 2010

(54) ELECTRIC DUST-PROOF DEVICE

(75) Inventors: Chun-Yu Hsueh, Changhua (TW); Duen-Kwei Hwang, Changhua (TW)

(73) Assignee: Asia Optical Co., Inc., Taichung (TW)

( * ) Notice: Subject to any disclaimer, the term of this patent is extended or adjusted under 35 U.S.C. 154(b) by 378 days.

(21) Appl. No.: 11/824,788

(22) Filed: Jul. 3, 2007

(65) Prior Publication Data
US 2008/0012982 A1 Jan. 17, 2008

(30) Foreign Application Priority Data
Jul. 13, 2006 (TW) ............................. 95125696 A (51) Int. Cl.
*H04N 5/225* (2006.01)
*G03B 13/34* (2006.01)
(52) U.S. Cl. ...................... 348/375; 396/133
(58) Field of Classification Search ................ 348/375; 396/133, 359, 448, 473, 477, 493, 495
See application file for complete search history.

(56) References Cited
U.S. PATENT DOCUMENTS
5,617,167 A * 4/1997 Kaji ............................ 396/448
6,212,335 B1 * 4/2001 Inazuka ....................... 396/85
2004/0047625 A1 * 3/2004 Ito et al. ...................... 396/429
2006/0055812 A1 * 3/2006 Takanashi et al. ........... 348/340

* cited by examiner

*Primary Examiner*—Tuan Ho
*Assistant Examiner*—Selam Gebriel
(74) *Attorney, Agent, or Firm*—Trop, Pruner & Hu, P.C.

(57) ABSTRACT

An electric dust-proof device includes a base seat, a driving mechanism, and a dust-proof cover. The driving mechanism is disposed on the base seat, and includes a power unit, and a drive unit. The drive unit includes a sliding seat driven by the power unit, a pair of first and second pushing portions disposed on the sliding seat and spaced apart from each other, and a guiding assembly for guiding reciprocal movement of the sliding seat along a direction. The dust-proof cover is disposed pivotally on the base seat, and has an engaging portion disposed between the first and second pushing portions, and a cover plate portion connected to the engaging portion. The first and second pushing portions cooperate to move the dust-proof cover between an open position and a close position as a result of the reciprocal movement of the sliding seat.

9 Claims, 7 Drawing Sheets

ELECTRIC DUST-PROOF DEVICE

CROSS-REFERENCE TO RELATED APPLICATION

This application claims priority of Taiwanese Application No. 095125696, filed on Jul. 13, 2006.

BACKGROUND OF THE INVENTION

1. Field of the Invention

This invention relates to a motor-driven device, and more particularly to an electric dust-proof device for use with a camera, a photographing camera, a projector, or other image formation apparatus to protect a lens thereof from dust.

2. Description of the Related Art

Figure 1:
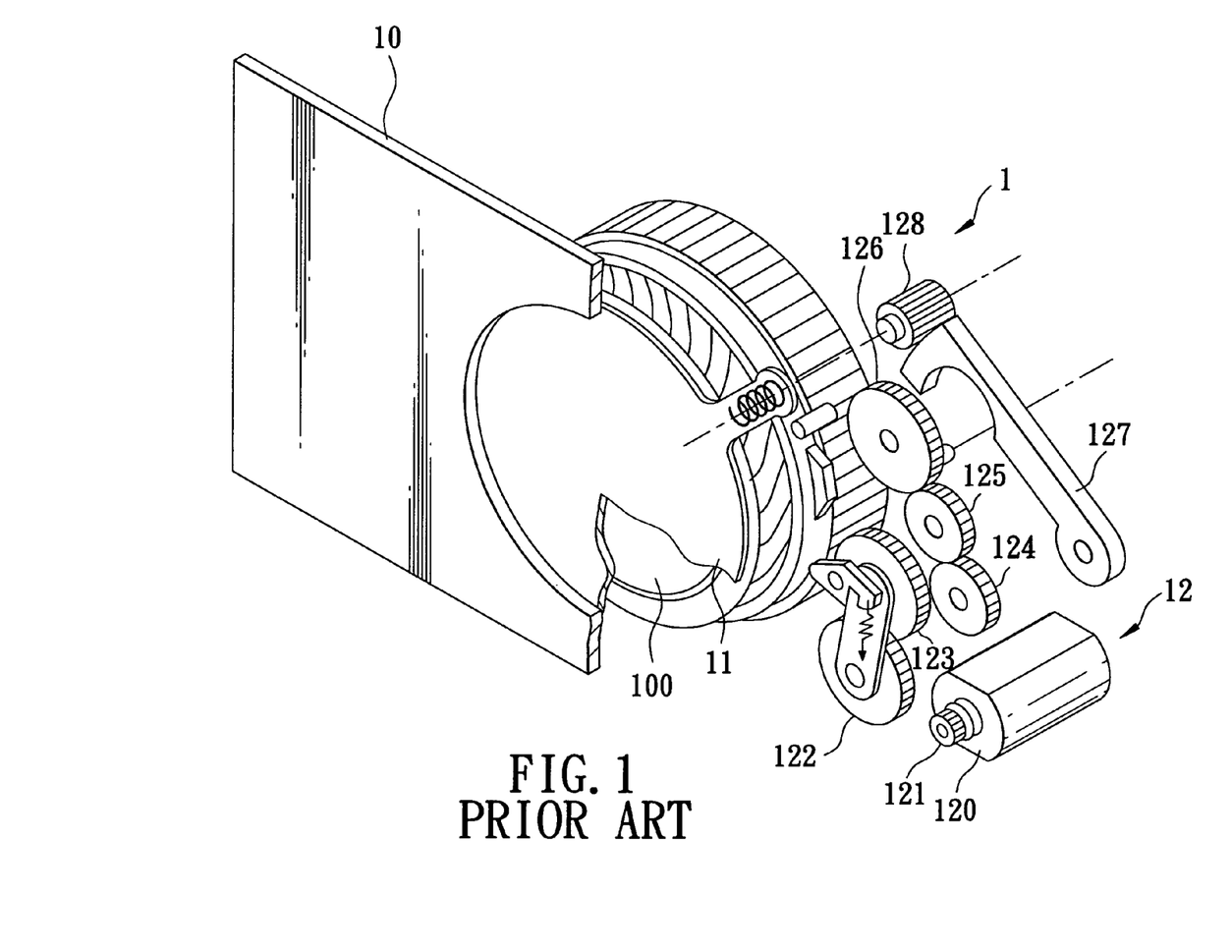
FIG. 1 is a perspective view of a conventional electric dust-proof device disclosed in U.S. Pat. No. 5,461,441.
Figure 2:
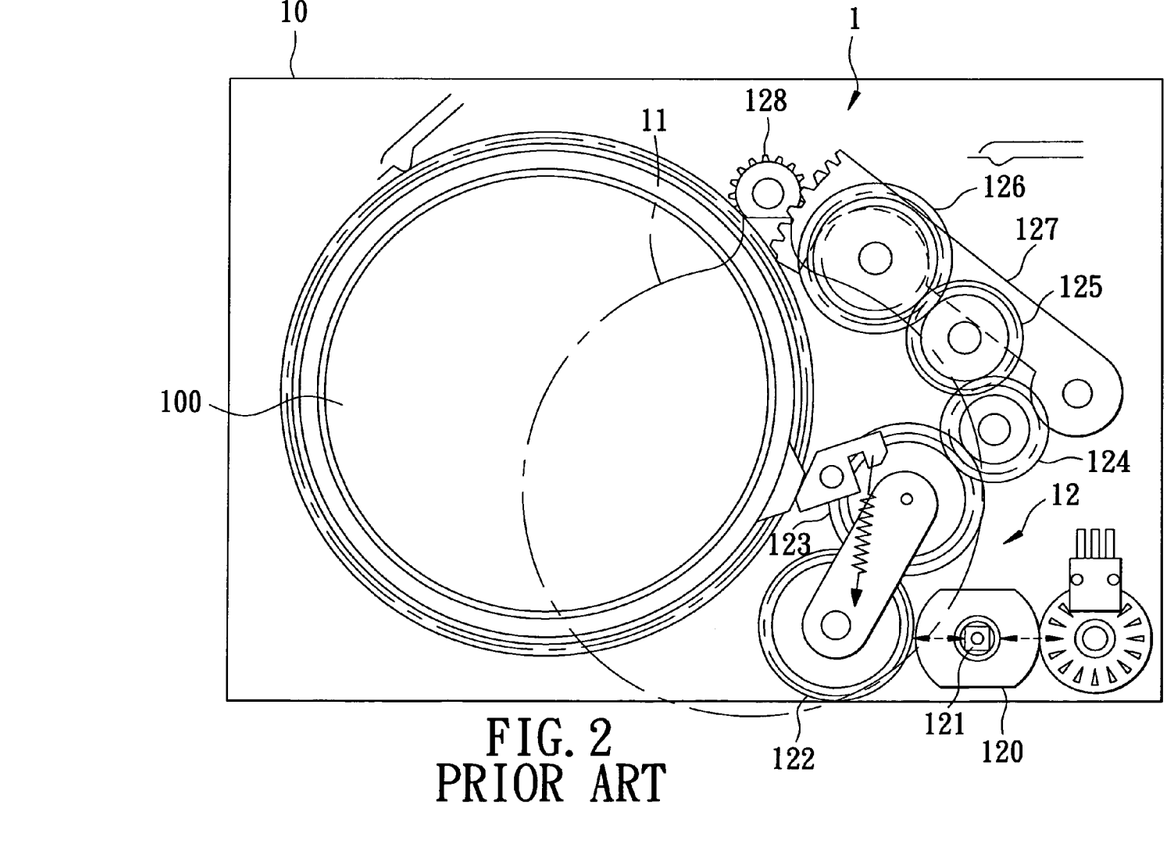
FIG. 2 is a side view of the conventional electric dust-proof device, illustrating a dust-proof plate in a partially open position.

Referring to FIGS. 1 and 2, an electric dust-proof device 1 disclosed in U.S. Pat. No. 5,461,441 is disposed in a housing 10 of a camera for protecting a lens 100 of the camera, and includes a dust-proof plate 11 for selectively covering the lens 100, and a driving unit 12 for driving the dust-proof plate 11 to move between an open position and a close position.

The driving unit 12 includes a motor 120, a driving gear 121 driven by the motor 120 to rotate in two directions, and a gearing consisting of a first gear 122, a second gear 123, a third gear 124, a fourth gear 125, a fifth gear 126, a rack gear 127, and a sixth gear 128. Each adjacent pair of the gears 121, 122, 123, 124, 125, 126, 127, 128 of the gearing meshes with each other. The first, second, third, fourth, fifth, and sixth gears 122, 123, 124, 125, 126, 128 are configured as spur gears.

To rotate the dust-proof plate 11 relative to the lens 100, the motor 120 is operated to rotate the driving gear 121. Rotation of the driving gear 121 is transferred to the first gear 122 by a plurality of interconnected gears (not shown), thereby rotating the second, third, fourth, fifth, and sixth gears 123, 124, 125, 126, 128 and moving the rack gear 127. Hence, the dust-proof plate 11 is rotated between the open position and the close position at a speed slower than that of the driving gear 121.

Although power can be transmitted from the motor 120 to the dust-proof plate 11, a large number of spur gears (i.e., the first, second, third, fourth, fifth, and sixth gears 122, 123, 124, 125, 126, 128) are disposed therebetween for the purpose of speed reduction, thus increasing the manufacturing costs of the electric dust-proof device 1 and the space occupied thereby and resulting in difficulties during assembly thereof.

SUMMARY OF THE INVENTION

The object of this invention is to provide an electric dust-proof device that can overcome the aforesaid disadvantages associated with the prior art.

Accordingly, an electric dust-proof device of this invention includes a base seat, a driving mechanism disposed on the base seat, and a dust-proof cover driven by the driving mechanism.

The driving mechanism includes a power unit, and a drive unit. The drive unit includes a sliding seat driven by the power unit driven by the power unit, a pair of first and second pushing portions disposed spacedly on the sliding seat, and a guiding assembly for guiding reciprocal movement of the sliding seat along a direction. The dust-proof cover is disposed pivotally on the base seat, and includes an engaging portion disposed between the first and second pushing portions, and a cover plate portion connected to the engaging portion. When the sliding seat reciprocates along the direction, the first and second pushing portions move the dust-proof cover between an open position and a close position.

As such, the number of the components of the electric dust-proof device and, thus, the space occupied by the electric dust-proof device are reduced. Furthermore, the electric dust-proof device can be assembled with ease and manufactured at a lower cost.

BRIEF DESCRIPTION OF THE DRAWINGS

These and other features and advantages of this invention will become apparent in the following detailed description of a preferred embodiment of this invention, with reference to the accompanying drawings, in which.

DETAILED DESCRIPTION OF THE PREFERRED EMBODIMENT

Figure 3:
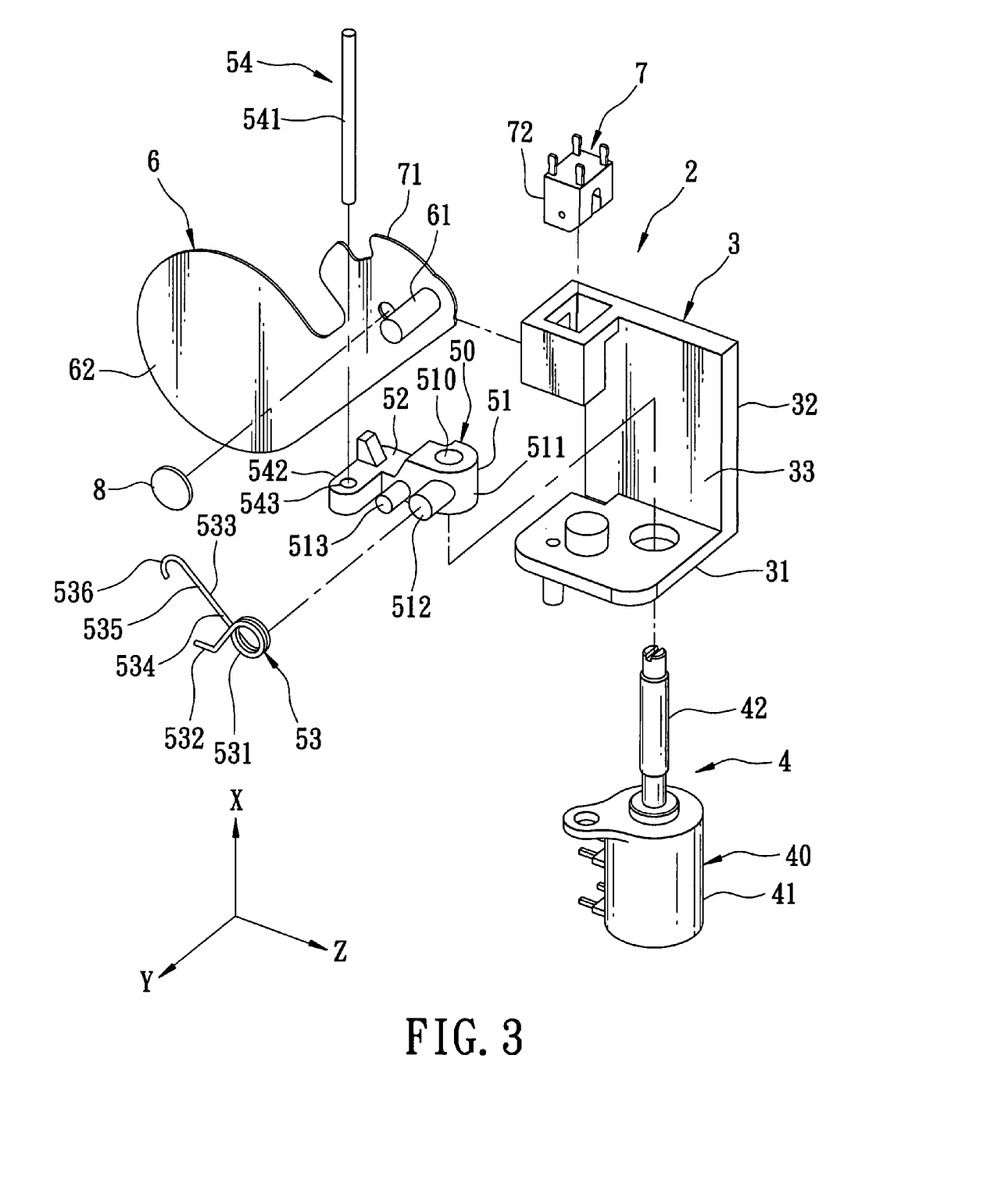
FIG. 3 is an exploded perspective view of the preferred embodiment of an electric dust-proof device according to this invention.
Figure 4:
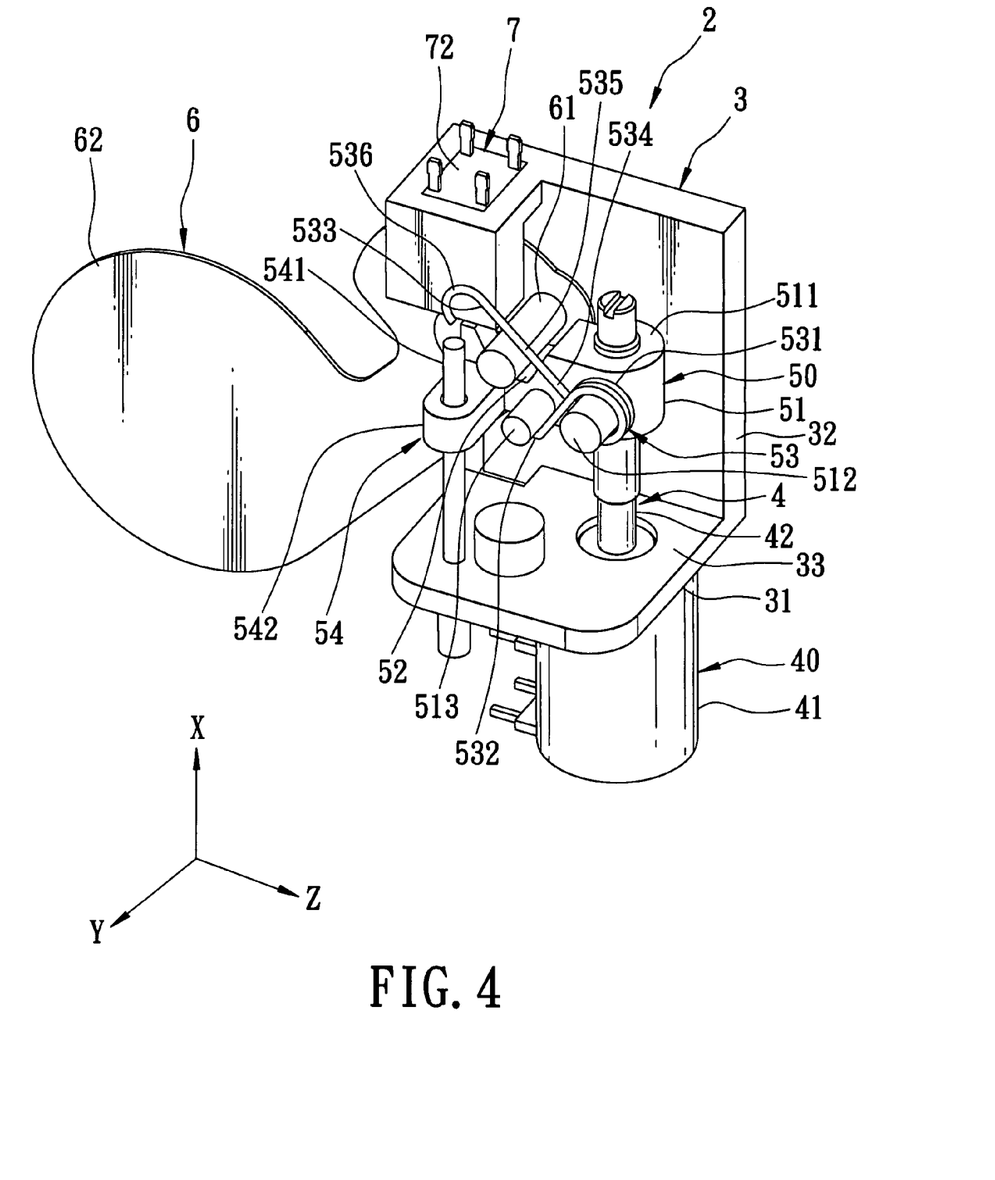
FIG. 4 is an assembled perspective view of the preferred embodiment.

Referring to FIGS. 3 and 4, the preferred embodiment of an electric dust-proof device 2 according to this invention includes a base seat 3, a driving mechanism 4 disposed on the base seat 3, a dust-proof cover 6 driven by the driving mechanism 4, and a position-sensing unit 7.

The base seat 3 has a base wall 31 and a sidewall 32 extending from the base wall 31 along a first direction (X) and cooperating with the base wall 31 to define an accommodating space 33.

The driving mechanism 4 includes a power unit 40 and a drive unit 50 driven by the power unit 40.

The power unit 40 is disposed on the base wall 31 of the base seat 3, and includes a motor 41 disposed outwardly of the accommodating space 33 in the base seat 3, and an externally threaded rod 42 extending through the base wall 31 and into the accommodating space 33 in the base seat 3 along the first direction (X) and driven by the motor 41 to rotate in two directions.

Figure 5:
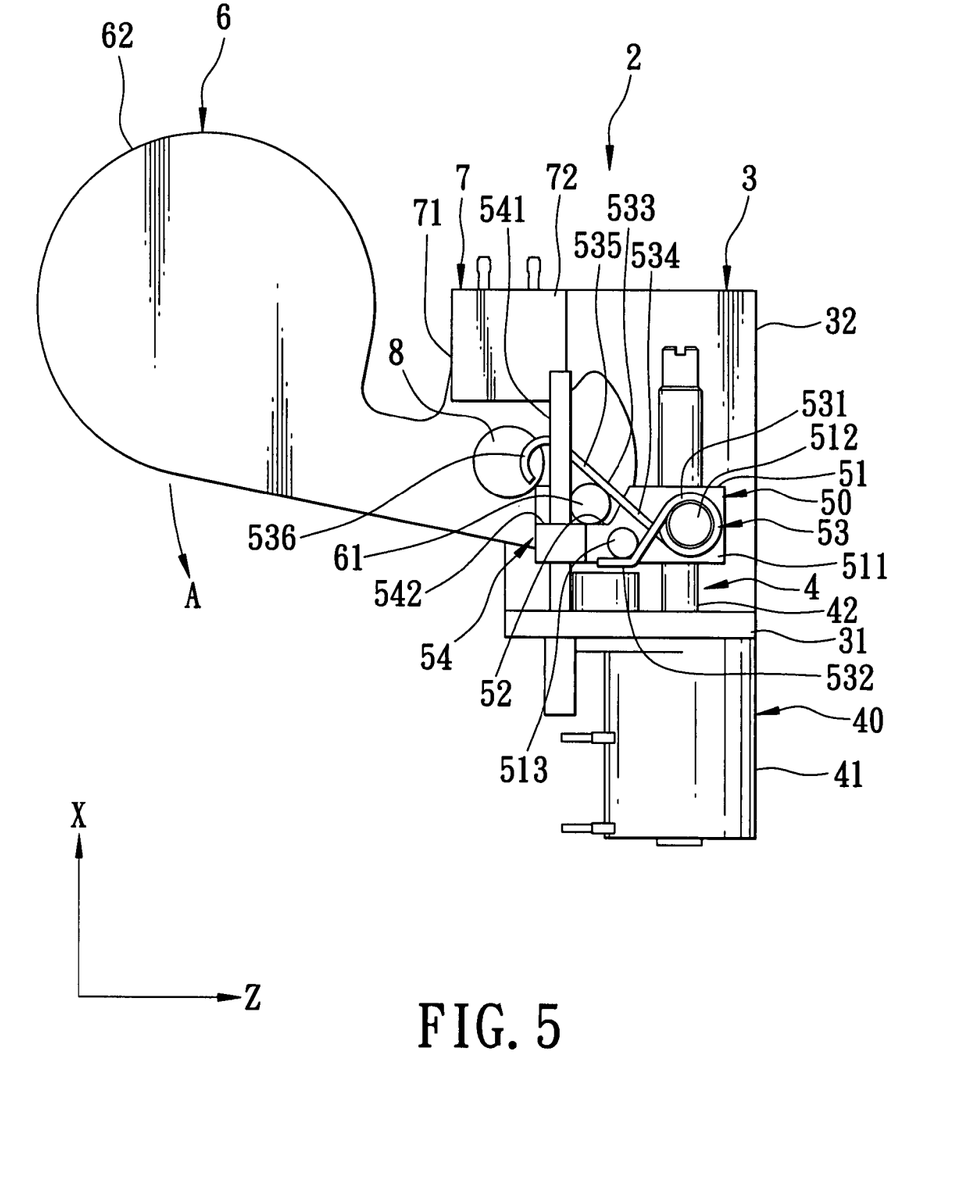
FIG. 5 is a schematic side view of the preferred embodiment when a dust-proof plate is disposed in a close position.
Figure 6:
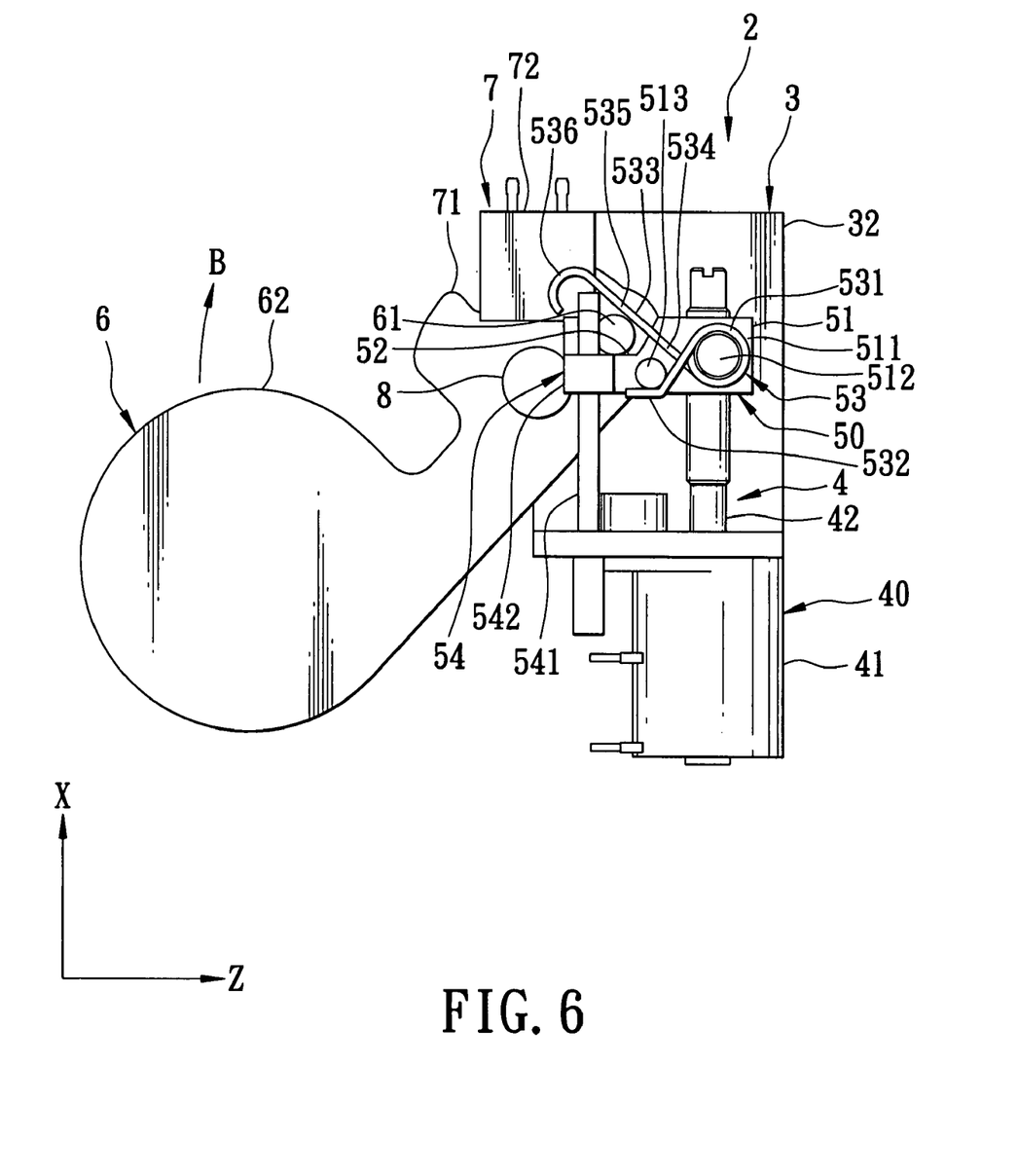
FIG. 6 is a view similar to FIG. 5 but when the dust-proof plate is disposed in an open position.

The drive unit 50 includes a sliding seat 51 having a threaded hole 510 engaging the externally threaded rod 42 such that rotation of the threaded rod 42 results in movement of the sliding seat 51 between upper and lower limit positions shown respectively in FIGS. 6 and 5 along the first direction (X), a first pushing portion 52 disposed on the sliding seat 51, an overloading protecting member 53 connected to the sliding seat 51, and a guiding assembly 54 for guiding reciprocal movement of the sliding seat 51 along the first direction (X).

The sliding seat 51 includes a seat body 511 engaging threadably the threaded rod 42, and a pair of first and second positioning rods 512, 513 extending from the seat body 511 along a second direction (Y) perpendicular to the first direction (X) and spaced apart from each other. The first pushing portion 52 extends integrally from the seat body 511 in a third direction (Z) perpendicular to the first and second directions (X, Y).

The overloading protecting member 53 is movable to contact with an engaging portion 61 of the dust-proof cover 6 to thereby deform, and is configured as a torsion spring. The overloading protecting member 53 includes a coiled portion 531 sleeved on the first positioning rod 512, a first end foot 532 extending from an end of the coiled portion 531 and pressing against the second positioning rod 513, and a second end foot 533 having a root portion 534 extending from an opposite end of the coiled portion 531, a second pushing portion 535 connected to the root portion 534, and a curved end portion 536 distal from the root portion 534. The second pushing portion 535 is spaced apart from the first pushing portion 52.

The guiding assembly 54 includes a guide rod 541 and a projection 542. The projection 542 extends from the first pushing portion 52 of the sliding seat 51, and is formed with a guide hole 543. The guide rod 541 is fixed on the base wall 31 of the base seat 3, is parallel to the threaded rod 42, and extends into the accommodating space 33 in the base seat 3 and through the guide hole 543 in the projection 542.

The dust-proof cover 6 is disposed pivotally on the sidewall 32 of the base seat 3 by a connecting member 8, and has an engaging portion 61 disposed between the first and second pushing portions 52, 535, and a cover plate portion 62 connected to the engaging portion 61. The first and second pushing portions 52, 535 cooperate to move the dust-proof cover 6 between a close position shown in FIG. 5 and an open position shown in FIG. 6 as a result of reciprocal movement of the sliding seat 51.

Figure 7:
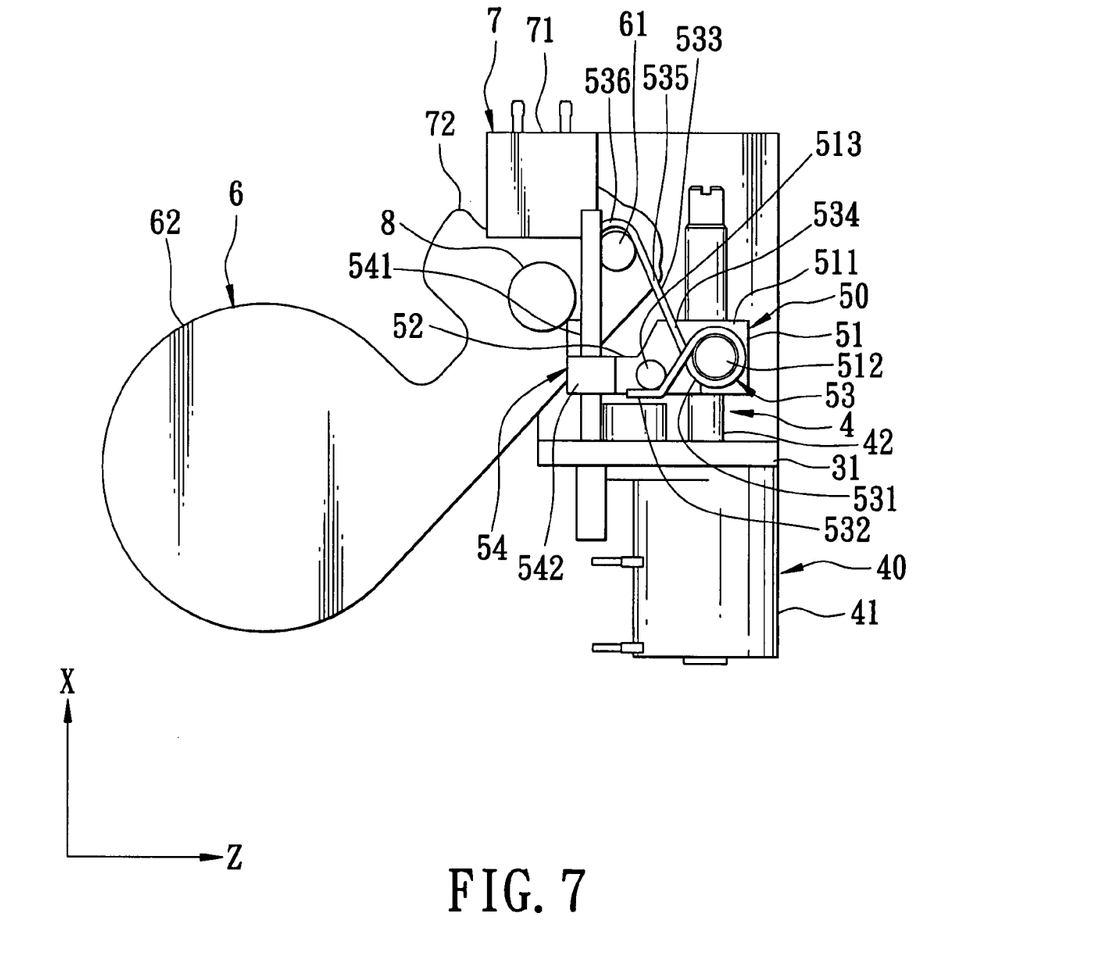
FIG. 7 is a view similar to FIG. 5, illustrating how an external force is applied to the dust-proof plate to deform an overloading protecting member and how the dust-proof plate is retained on the overloading protecting member.

The engaging portion 61 of the dust-proof cover 6 is configured as a circular rod that extends along the second direction (Y) and that is pushed by the first and second pushing portions 52, 535 to pivot about the connecting member 8. The engaging portion 61 is pivotable upwardly to engage the curved end portion 536 of the second end foot 533 of the overloading protecting member 53 to thereby prevent further upward pivoting movement thereof, as shown in FIG. 7.

The position-sensing unit 7 includes a light-shielding plate portion 71 and a sensor 72. The sensor 72 is disposed on the sidewall 32 of the base seat 3. The light-shielding plate portion 71 extends integrally and outwardly from the cover plate portion 62 of the dust-proof cover 6, and is pivotable to align with the sensor 72.

With additional reference to FIG. 5, to pivot the dust-proof cover 6 from the close position to the open position, the motor 41 of the power unit 4 is operated to rotate the threaded rod 42 in a fourth direction to thereby move the sliding seat 51 upwardly from the lower limit position to the upper limit position along the first direction (X) while being guided by the guiding assembly 54. Hence, the first pushing portion 52 pushes the engaging portion 61 upwardly to pivot the dust-proof cover 6 downwardly about the connecting member 8 in a direction (A) to the open position. During pivoting movement of the dust-proof cover 6 from the close position to the open position, the sensor 72 detects a change in the position of the light-shielding plate 71 to thereby emit a signal for stopping the motor 41 under control of a controller (not shown). As a result, the dust-proof cover 6 stays at the open position.

With additional reference to FIG. 6, subsequently, to pivot the dust-proof cover 6 to the close position, the motor 41 is operated to rotate the threaded rod 42 in a fifth direction opposite to the fourth direction to thereby move the sliding seat 51 downwardly from the upper limit position to the lower limit position along the first direction (X) while being guided by the guiding assembly 54. Hence, the downward pushing of the second pushing portion 535 on the engaging portion 61 of this time results in upward pivoting of the dust-proof cover 6 about the connecting member 8 in a direction (B) to the close position. During pivoting movement of the dust-proof cover 6 from the open position to the close position, the sensor 72 detects a change in the position of the light-shielding plate 71 to thereby emit a signal for stopping the motor 41 under control of the controller. As a result, the dust-proof cover 6 stays at the close position.

As such, in a normal condition, the dust-proof cover 6 is moved from the close position to the open position by the first pushing portion 52 and from the open position to the close position by the second pushing portion 535.

With additional reference to FIG. 7, while attempting to pivot the dust-proof cover 6 from the open position to the close position, if an external force is exerted on the dust-proof cover 6 to impede pivoting movement of the dust-proof cover 6 toward the close position, the sliding seat 51 nevertheless moves to the lower limit position such that the coiled portion 531 of the overloading protecting member 53 deforms, and, since the dust-proof cover 6 is unable to move, the second end foot 533 will slide on the engaging portion 61 of the dust-proof cover 6 to thereby eventually engage the engaging portion 61 with the curved end portion 536 of the second end foot 533. When the external force is removed, the curved end portion 536 and the second pushing portion 535 of the second end foot 533 cooperate to push and pivot the engaging portion 61 of the dust-proof cover 6 downwardly to thereby pivot the dust-proof cover 6 upwardly to the close position.

In addition, when an external force is exerted on the dust-proof cover 6 to pivot the same from the close position to the open position, since the sliding seat 51 remains in the lower limit position, the engaging portion 61 of the dust-proof cover 6 slides along the second pushing portion 535 of the second end foot 533 to engage the curved end portion 536 of the second end foot 533 such that the coiled portion 531 of the overloading protecting member 53 deforms. When the external force is removed, the curved end portion 536 and the second pushing portion 535 of the second end foot 533 cooperate to push and pivot the engaging portion 61 of the dust-proof cover 6 downwardly to thereby pivot the dust-proof cover 6 upwardly back to the close position.

From the foregoing, the electric dust-proof device 2 of this invention has the following advantages:

Power is transmitted from the motor 41 to the dust-proof cover 6 by the threaded rod 42, the sliding seat 51, and the overloading protecting member 53. This is in contrast to the large number of spur gears required for power transmission in the electric dust-proof device disclosed in U.S. Pat. No. 5,461,441. Since the number of the elements for power transmission is reduced significantly, the electric dust-proof device 2 can be assembled with ease and manufactured at a lower cost. Furthermore, the space occupied by the electric dust-proof device 2 is reduced.

It is noted that, in a situation where the dust-proof device 2 is applied to an image formation apparatus having a metal housing, the base seat 3 is a separate member. Also, in a situation where the dust-proof device 2 is applied to an image formation apparatus having a plastic casing, the base seat 3 may be formed integrally with the plastic casing.

With this invention thus explained, it is apparent that numerous modifications and variations can be made without departing from the scope and spirit of this invention. It is therefore intended that this invention be limited only as indicated by the appended claims.

We claim:

1. An electric dust-proof device comprising:
a base seat;
a driving mechanism disposed on said base seat and including
a power unit, and
a drive unit including a sliding seat driven by said power unit, a pair of first and second pushing portions disposed on said sliding seat and spaced apart from each other, and a guiding assembly for guiding reciprocal movement of said sliding seat along a first direction; and
a dust-proof cover disposed pivotally on said base seat and having an engaging portion disposed between said first and second pushing portions, and a cover plate portion connected to said engaging portion, said first and second pushing portions cooperating to move said dust-proof cover between an open position and a close position as a result of the reciprocal movement of said sliding seat.

2. The electric dust-proof device as claimed in claim 1, further comprising a position-sensing unit, which includes a light-shielding plate portion extending outwardly from said cover plate portion, and a sensor disposed on said base seat, said light-shielding plate portion being pivotable to align with said sensor.

3. The electric dust-proof device as claimed in claim 1, wherein said drive unit further includes an overloading protecting member that is connected to said sliding seat, that has said second pushing portion, and that is movable to contact said engaging portion of said dust-proof cover to thereby deform.

4. The electric dust-proof device as claimed in claim 1, wherein said power unit includes a motor disposed on said base seat, and an externally threaded rod extending along said first direction and driven by said motor to rotate in two directions, said sliding seat having a threaded hole engaging said externally threaded rod such that rotation of said externally threaded rod results in movement of said sliding seat along said first direction.

5. The electric dust-proof device as claimed in claim 4, wherein:
said sliding seat includes a seat body engaging threadably said externally threaded rod, and a pair of first and second positioning rods extending from said seat body along a second direction perpendicular to said first direction and spaced apart from each other, said first pushing portion extending integrally from said seat body in a third direction perpendicular to said first and second directions; and
said overloading protecting member is configured as a coiled torsion spring, which has a coiled portion sleeved on said first positioning rod, a first end foot extending from an end of said coiled portion and pressing against said second positioning rod, and a second end foot having a root portion extending from an opposite end of said coiled portion, said second pushing portion constituting a part of said second end foot and being connected to said root portion.

6. The electric dust-proof device as claimed in claim 5, wherein said second end foot of said overloading protecting member further has a curved end portion distal from said root portion, said engaging portion of said dust-proof cover being configured as a circular rod that extends along said second direction, that is pushed by said first and second pushing portions to pivot, and that is pivotable in a predetermined direction to engage said curved end portion of said second end foot of said torsion spring to thereby prevent further pivoting movement of said circular rod in said predetermined direction.

7. The electric dust-proof device as claimed in claim 6, wherein:
said base seat has a base wall and a sidewall extending from said base wall along said first direction and cooperating with said base wall to define an accommodating space;
said motor is disposed outwardly of said accommodating space in said base seat; and
said externally threaded rod extends through said base wall and into said accommodating space in said base seat.

8. The electric dust-proof device as claimed in claim 7, wherein said guiding assembly includes:
a projection extending from said first pushing portion of said sliding seat and formed with a guide hole; and
a guide rod fixed on said base wall of said base seat and parallel to said externally threaded rod, said guide rod extending into said accommodating space in said base seat and through said guide hole in said projection.

9. The electric dust-proof device as claimed in claim 8, further comprising a position-sensing unit that includes a sensor and a light-shielding plate portion, said light-shielding plate extending integrally and outwardly from said cover plate portion of said dust-proof cover, said sensor being disposed on said sidewall of said base seat, said light-shielding plate portion being pivotable to align with said sensor.

* * * * *